United States Patent
Sato (10) Patent No.: US 8,427,546 B2
(45) Date of Patent: Apr. 23, 2013

(54) IMAGING APPARATUS

(75) Inventor: Masafumi Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 31 days.

(21) Appl. No.: 12/981,829

(22) Filed: Dec. 30, 2010

(65) Prior Publication Data

US 2011/0273573 A1    Nov. 10, 2011

(30) Foreign Application Priority Data

Jan. 6, 2010  (JP) .................................. 2010-000968
Dec. 17, 2010  (JP) .................................. 2010-281896

(51) Int. Cl.
  *H04N 5/225*  (2006.01)
  *H04N 5/76*  (2006.01)
(52) U.S. Cl.
  USPC ..................................... 348/220.1; 348/231.9
(58) Field of Classification Search ............... 348/231.9, 348/220.1–231.3, 231.7, 231.8
  See application file for complete search history.

(56) References Cited

U.S. PATENT DOCUMENTS 6,674,467 B1 * 1/2004 Lee ........................... 348/231.2
7,050,032 B2 * 5/2006 Tamura ............................ 345/98
7,787,019 B2 * 8/2010 Nonaka ....................... 348/221.1
2009/0033754 A1 * 2/2009 Yoshikawa ................. 348/220.1

FOREIGN PATENT DOCUMENTS

JP   2007-251414    9/2007

* cited by examiner

*Primary Examiner* — Chieh M Fan
*Assistant Examiner* — Ahmed A Berhan
(74) *Attorney, Agent, or Firm* — Wenderoth, Lind & Ponack, L.L.P.

(57) ABSTRACT

It is an object of the present invention to provide an imaging apparatus for simultaneously taking a still image and a moving image that hardly causes a fail in taking a moving image. The imaging apparatus is characterized by including an imaging means capable of taking a subject image and generating still image data and moving image data, a first storage means capable of temporarily storing the still image data and the moving image data generated by the imaging means, a second storage means, a transfer means capable of reading the still image data and the moving image data stored in the first storage means and transferring them to the second storage means, and a control means for controlling the transfer means so that any one of the still image data and the moving image data is transferred to the second storage means according to a status of use of the first storage means.

5 Claims, 9 Drawing Sheets

IMAGING APPARATUS

BACKGROUND OF THE INVENTION

The present invention relates to an imaging apparatus, specifically to an imaging apparatus which is capable of simultaneously taking still images and moving images.

Patent Document 1 (Japanese Patent Laid-Open Publication No. 2007-251414) discloses an imaging apparatus which is capable of simultaneously taking moving images and still images. In this imaging apparatus, when a flash lamp emits light during taking a moving image, a frame included in a moving image file to which the strobe light is emitted from the flash lamp is related to light emitting information (strobe light emitting flag), and the frame related to the light emitting information is extracted from the moving image file.

In this imaging apparatus, a still image imaging process during taking a moving image can be achieved by a process which is simpler than a conventional process, thereby it can be possible to take a still image without missing a shutter opportunity and to take a moving image with continuity being maintained, according to the Patent Document 1.

However, the imaging apparatus disclosed in Patent Document 1 only extracts one frame as a still image file from a moving image file. Further, the Patent Document 1 does not disclose a technique for generating still image data separately from moving image data.

As is well known, when moving images are took by the imaging apparatus which is capable of simultaneously taking moving images and still images, it is very important to maintain continuity of recording of moving image data obtained by taking moving images regardless of the still image imaging process during taking the moving images.

SUMMARY OF THE INVENTION

The object of the present invention is to provide an imaging apparatus which is capable of simultaneously taking still images and moving images, wherein the imaging apparatus hardly causes a failure in taking a moving image (namely, a situation such that the continuity of recording of moving image data is deteriorated).

Therefore, an imaging apparatus according to the present invention is characterized by including an imaging means for capable of taking a subject image and generating still image data and moving image data, a first storage means capable of temporarily storing the still image data and the moving image data generated by the imaging means, a second storage means, a transfer means capable of reading the still image data and the moving image data stored in the first storage means and transferring them to the second storage means, and a control means for controlling the transfer means so that any one of the moving image data and the still image data is transferred to the second storage means according to a status of use of the first storage means.

In the imaging apparatus according to the present invention, the first storage means may include a moving image data storage means for temporarily storing the moving image data, and a still image data storage means for temporarily storing the still image data.

Also, in the imaging apparatus according to the present invention, when a used amount of the first storage means is equal to or more than a predetermined amount, the control means may control the transfer means so that the still image data stored in the first storage means is not transferred to the second storage means but the moving image data is transferred to the second storage means.

In this case, when the used amount of the first storage means is less than the predetermined amount, the control means may permit the transfer of the still image data to the second storage means.

Further, the imaging apparatus according to the present invention may be configured so that it further includes an accepting means for accepting an instruction for taking a still image from a user, and a display means for starting display indicating that the still image is being took according to the acceptance of the instruction for taking the still image from the user by the accepting means, and periods for displaying the indication that the still image is being took on the display means may vary in accordance with the status of use of the first storage means.

In this case, as the used amount of the first storage means is larger, the period for displaying indication that the still image is being took on the display means may be made to be longer.

According to the present invention, it is possible to provide with an imaging apparatus that simultaneously takes still images and moving images and hardly causes a failure in taking moving images.

BRIEF DESCRIPTION OF THE DRAWINGS

The present invention is described in more detail below with reference to accompanying drawings.

DETAILED DESCRIPTION OF THE PREFERRED EMBODIMENTS

Preferred embodiments of the present invention are described below with reference to the accompanying drawings.

<1. First Embodiment>

<1-1. Outline>

A digital video camera 100 according to a first embodiment has imaging functions for both a still image and a moving image. Further, this digital video camera 100 can accept an instruction for taking a still image during recording of a moving image in principle.

Particularly the digital video camera 100 is configured so that it can realize a function for accepting the instruction for taking a still image during recording of a moving image in principle, and hardly cause a failure in taking a moving image.

<1-2. Constitution>
<1-2-1. Electrical Constitution>

Figure 1:
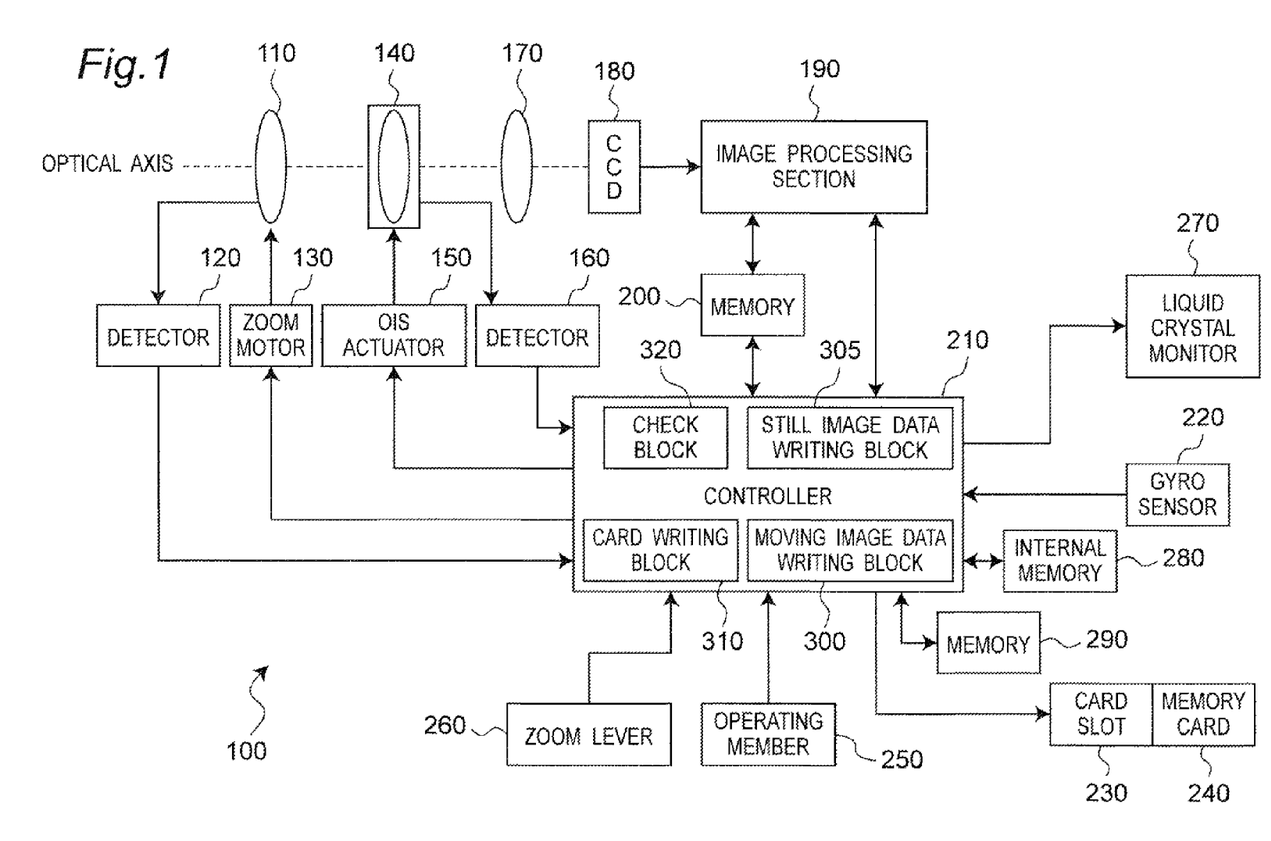
FIG. 1 is a block diagram illustrating a constitution of a digital video camera 100.

An electrical constitution of the digital video camera 100 according to the first embodiment will be explained with reference to FIG. 1. FIG. 1 is a block diagram illustrating a constitution of the digital video camera 100. In the digital video camera 100, a CCD image sensor 180 takes a subject image formed by an optical system composed of a zoom lens 110 and the like. Moving image data generated by the CCD image sensor 180 is subject to various processes in an image processing section 190 and stored in a memory card 240. Further, the moving image data stored in the memory card 240 can be displayed on a liquid crystal monitor 270. The constitution of the digital video camera 100 will be explained in detail below.

The optical system of the digital video camera 100 includes a zoom lens 110, an optical image stabilizer (OIS) 140, and a focus lens 170. The zoom lens 110 is capable of enlarging or reducing a subject image by moving along an optical axis of the optical system. The focus lens 170 moves along the optical axis of the optical system so as to adjust a focus of a subject image.

The OIS 140 has a correction lens that can move in a plane vertical to the optical axis. The OIS 140 drives the correction lens to a direction where a shake of the digital video camera 100 is cancelled, so that a shake of a subject image can be reduced.

A zoom motor 130 drives the zoom lens 110. The zoom motor 130 may be realized by a pulse motor, a DC motor, a linear motor or a servo motor and the like. The zoom motor 130 may drive the zoom lens 110 via a mechanism such as a cam mechanism or a ball screw. A detector 120 is for detecting a position on the optical axis where the zoom lens 110 is present. The detector 120 outputs a signal relating to the position of the zoom lens by means of a switch such as a brush type according to a movement of the zoom lens 110 to the optical axis direction.

An OIS actuator 150 is to drive the correcting lens in the OIS 140 in the plane vertical to the optical axis. The OIS actuator 150 can be realized by a planar coil, an ultrasonic motor or the like. Further, the detector 160 is for detecting a travel distance of the correcting lens in the OIS 140.

The CCD image sensor 180 takes a subject image formed by the optical system composed of the zoom lens 110 or the like and generates moving image data. The CCD image sensor 180 performs various operations such as exposure, transfer, and electronic shutter.

An image processing section 190 can execute various processes on the moving image data generated by the CCD image sensor 180. The image processing section 190 executes a process on the moving image data generated by the CCD image sensor 180, so as to generate moving image data for displaying on the liquid crystal monitor 270 or generate moving image data for restoring in the memory card 240.

For example, the image processing section 190 executes various processes such as gamma correction, white balance correction and scratch correction on the moving image data generated by the CCD image sensor 180. Further, the image processing section 190 compresses the moving image data generated by the CCD image sensor 180 according to a compressing format based on an H.264 standard and an MPEG 2 standard. The image processing section 190 can be realized by a digital signal processor (DSP) or a microcomputer.

A controller 210 is a control means for controlling the entire digital video camera. For example, the controller 210 has a moving image data writing block 300, a still image data writing block 305, a card writing block 310 and a check block 320.

The moving image data writing block 300 is a function block for writing the moving image data generated by the image processing section 190 into a memory 290. Further, the still image data writing block 305 is a function block for writing the still image data generated by the image processing section 190 into the memory 290. The card writing block 310 is a function block for reading the moving image data and the still image data from the memory 290 and writing them into the memory card 240. The check block 320 is a function block for checking a capacity of the moving image data or the still image data accumulated in the memory 290.

The controller 210 can be realized by a semiconductor integrated circuit or the like. The controller 210 may be constituted only by hardware or may be realized by combining hardware and software. The controller 210 can be realized by a microcomputer or the like.

A memory 200 functions as a work memory capable of temporarily saving data of the image processing section 190 and the controller 210. The memory 200 can be realized by a DRAM, a ferroelectric memory or the like.

The liquid crystal monitor 270 can display an image represented by the moving image data generated by the CCD image sensor 180 or an image represented by the moving image data read from the memory card 240.

A gyro sensor 220 is composed of an oscillating material such as a piezoelectric element and the like. The gyro sensor 220 oscillates the oscillating material such as the piezoelectric element at a constant frequency and converts a force obtained by a Coriolis force into a voltage so as to obtain angular velocity information. The angular velocity information is obtained from the gyro sensor 220 and the correcting lens in OIS is driven in a direction where the oscillation is cancelled, so that the digital video camera 100 corrects a user's camera shake.

The memory card 240 can be attached to and detached from a card slot 230. The card slot 230 can be mechanically and electrically connected to the memory card 240. The memory card 240 includes a flash memory or a ferroelectric memory and the like, and can store data therein.

An internal memory 280 is composed of a flash memory or a ferroelectric memory and the like. The internal memory 280 stores a control program or the like for controlling the entire digital video camera 100.

The memory 290 is a buffer memory for, when moving image data is generated, temporarily accumulating the generated moving image data before the moving image data is written into the memory card 240.

An operating member 250 is a generic name of a member that accepts user's operations such as the imaging instruction. A zoom lever 260 is a member for accepting an instruction for changing a zoom magnification from a user.

<1-2-2. Correspondence to the Present Invention>

The constitution including the optical system (the zoom lens 110, the OIS 140, the focus lens 170), the CCD image sensor 180 and the image processing section 190 is one example of an imaging means of the present invention. The memory 290 is one example of a first storage means of the present invention. The memory card 240 is one example of a second storage means of the present invention. The card writing block 310 is one example of a transfer means of the present invention. A shutter button in the operating member 250 is one example of an accepting means of the present invention. The check block 320 is one example of a control means of the present invention. The liquid crystal monitor 270 is one example of a display means of the present invention.

<1-3. Operation>
<1-3-1. Operation for Recording Moving Images>

Figure 2:
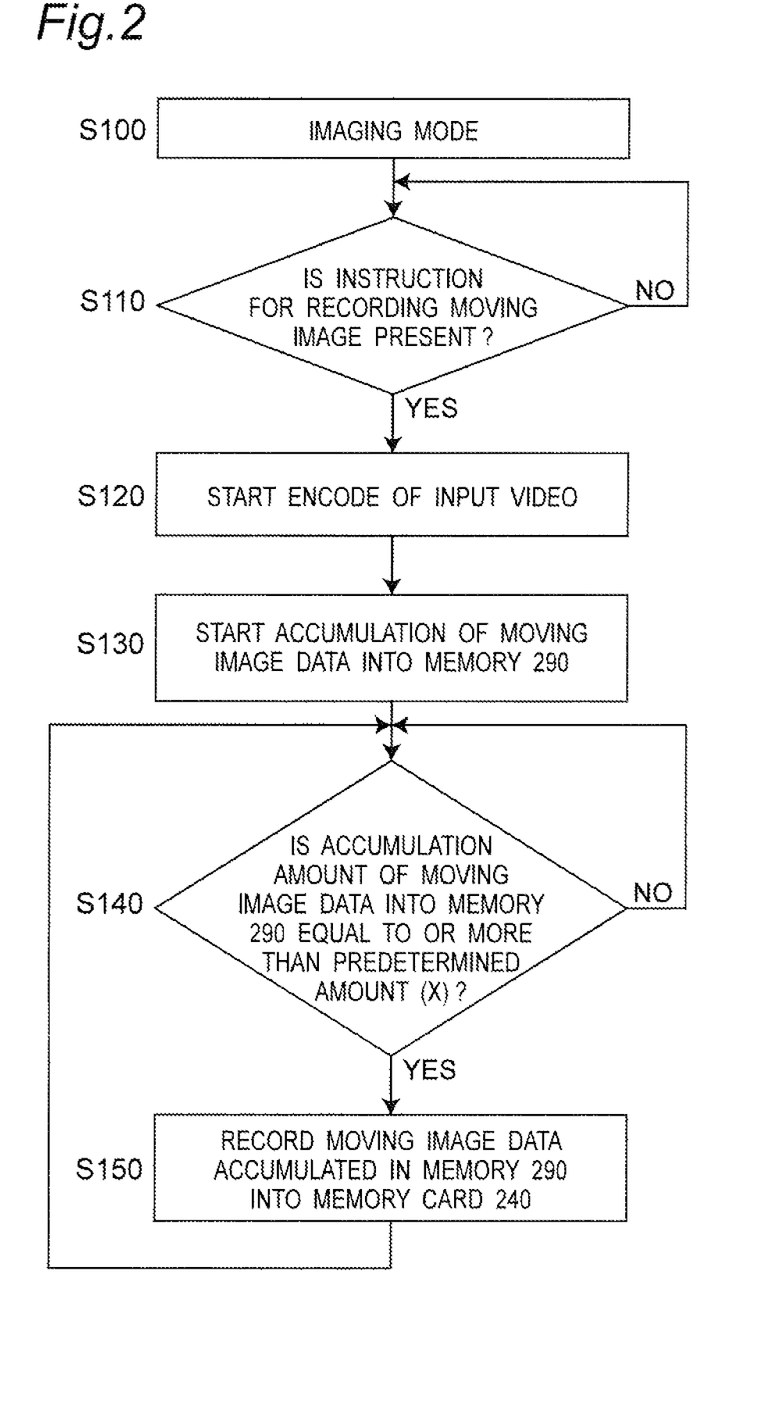
FIG. 2 is a flowchart illustrating an operation flow for recording moving images.

An operation for recording moving image data in the digital video camera 100 according to the embodiment will be explained with reference to FIG. 2. FIG. 2 is a flowchart illustrating an operation flow for recording moving images in the digital video camera 100.

A user operates a mode selection dial in the operating member 250, and can set the digital video camera 100 into an imaging mode (step S100).

When the digital video camera 100 is set into the imaging mode, the controller 210 determines whether the recording of a moving, image is instructed according to whether a moving image imaging button in the operating member 250 is turned ON (step S110). When the controller 210 determines that the recording of a moving image is instructed (YES at step S110), the controller 210 controls the image processing section 190 so that encode of an input video is started (step S120). When the determination is made that the recording of a moving image is not instructed (NO at step S110), the determining step S110 is continuously repeated.

When the encode of the input video is started (step S120), the moving image data writing block 300 in the controller 210 starts to accumulate the encoded moving image data in the memory 290 (step S130).

When the accumulation of the moving image data in the memory 290 is started, the card writing block 310 in the controller 210 determines whether moving image data equal to or more than a predetermined amount (X) is accumulated in the memory 290 (step S140). When the determination is made that the moving image data equal to or more than the predetermined amount (X) is accumulated in the memory 290 (YES at step S140), the card writing block 310 reads the moving image data accumulated in the memory 290, and writes the moving image data into the memory card 240 (step S150).

Thereafter, while the recording of a moving image continues, the card writing block 310 repeats steps S140 to S150.

The above operations realize the recording of the moving image data into the memory card 240.

When the user turns OFF the moving image imaging button in the operating member 250 to stop the imaging of a moving image or the memory card 240 runs out of the residual capacity, the recording of the moving image data into the memory card 240 is stopped.

<1-3-2. Operation in the Case where the Imaging of
Still Image is instructed during the Recording of Moving Image>

Figure 3:
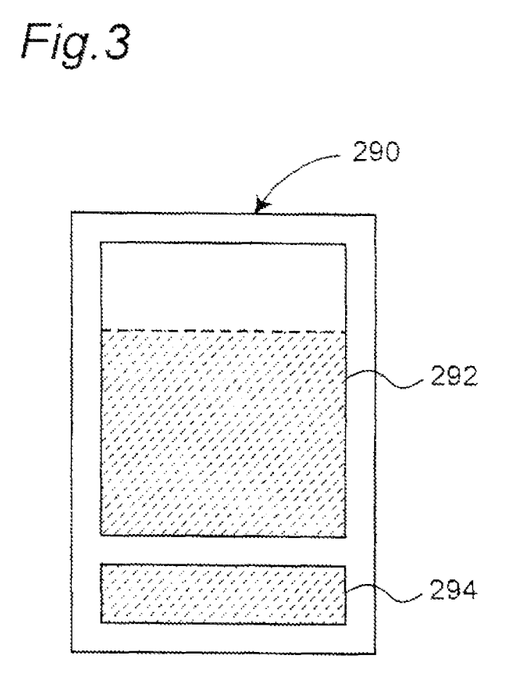
FIG. 3 is a schematic drawing illustrating a memory constitution in a memory 290.

Next, an operation in the case where the imaging of a still image is instructed during the recording of a moving image will be explained below. A memory structure in the memory 290 will be first explained with reference to FIG. 3. As shown in FIG. 3, the memory 290 includes therein a moving image region 292 where moving image data are recorded, and a still image region 294 where still image data are recorded. Moving image data imaged continuously are sequentially input into the moving image region 292. The input moving image data are sequentially recorded into the memory card 240 via the card slot 230. The still image region 292 is a data region whose data capacity is set for storage of still image data of one page or a plurality of pages (for example, 2 or 3). Imaged still image data of one or a plurality of pages are also input into the still image region 292. The input still image data are recorded in the memory card 240 via the card slot 230.

In an example of FIG. 3, the memory 290 is constituted so that the moving image region 292 and the still image region 294 are separated as regions having one group of addresses respectively. However, the structure of the memory 290 is not necessarily limited to the structure where the regions are separated. For example, the addresses of the moving image region 292 and the addresses of the still image regions 294 may be mixed if, for example, they are easily managed as a matter of logic. Also, the moving image region 292 and the still image region 294 may be constituted as individual memories.

Figure 4:
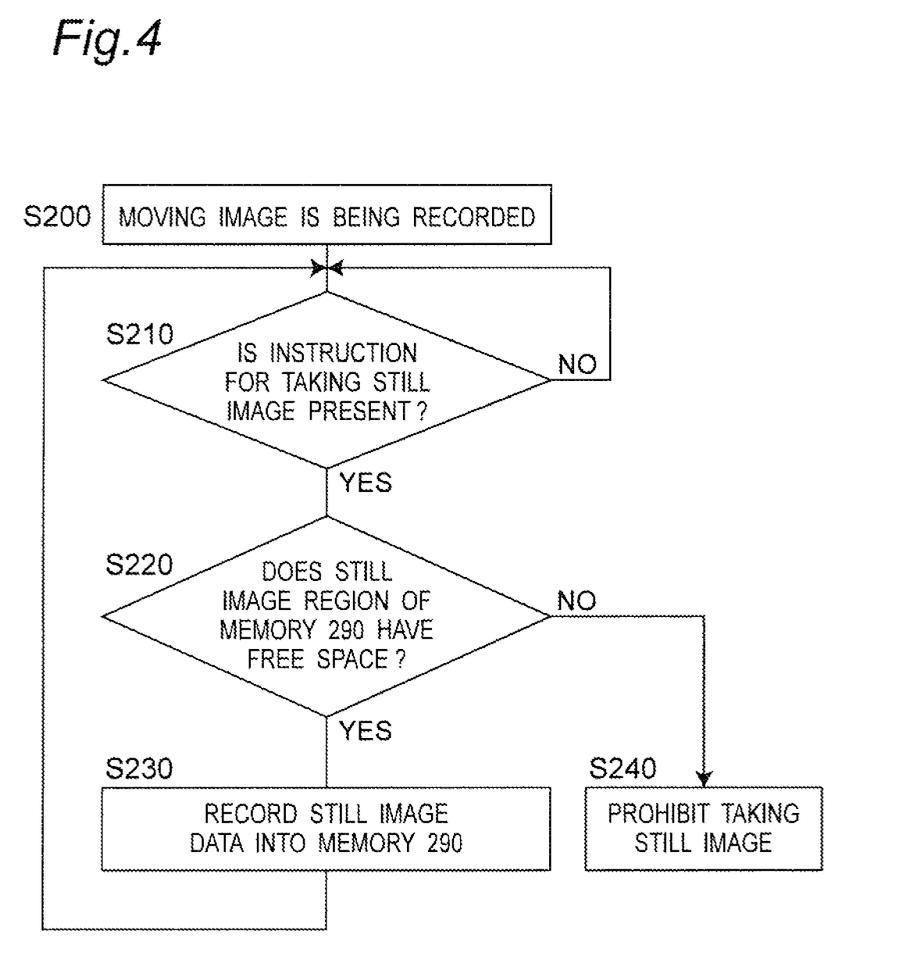
FIG. 4 is a flowchart illustrating an operation flow for recording still images during recording of moving images.
Figure 5:
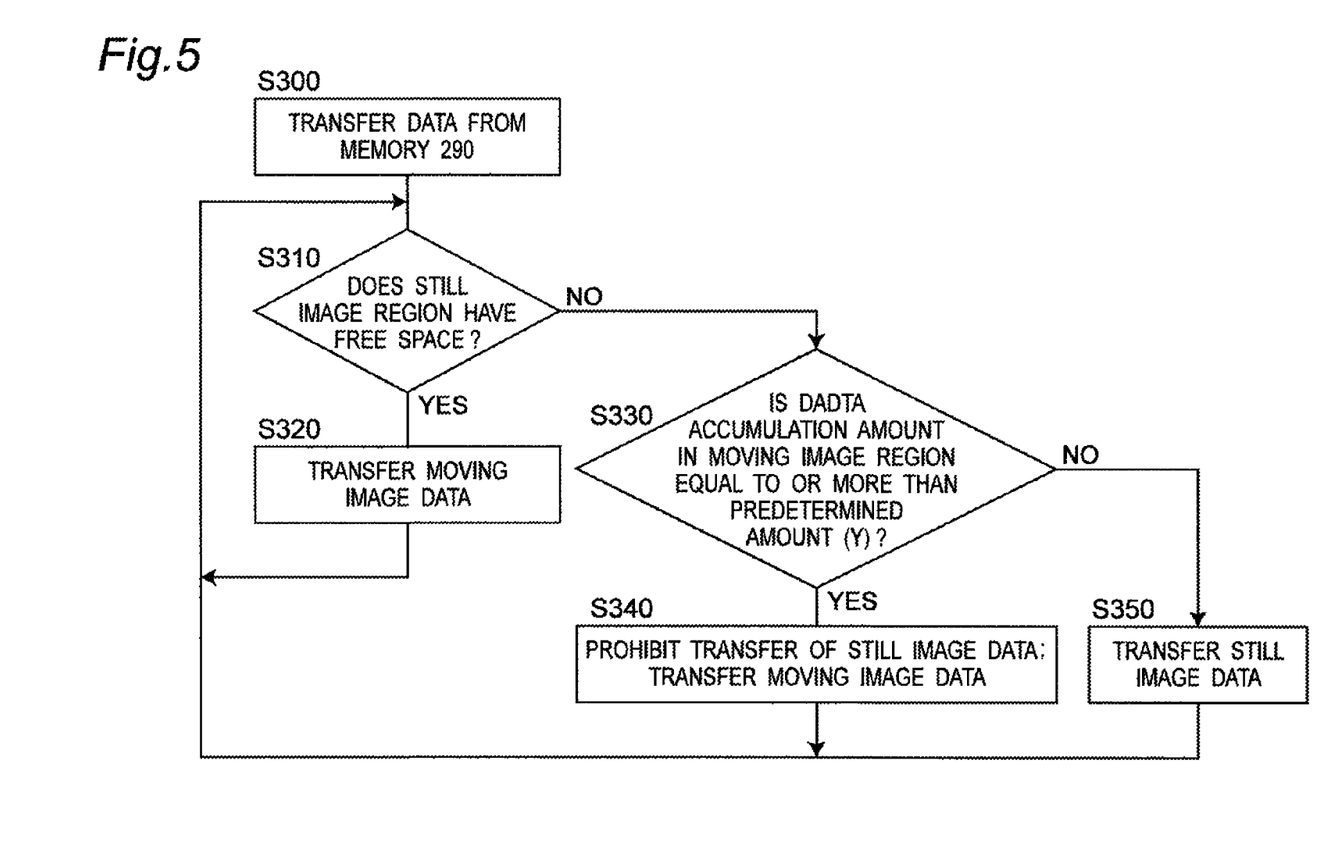
FIG. 5 is a flowchart illustrating an operation flow for transferring data from the memory 290.
Figure 6:
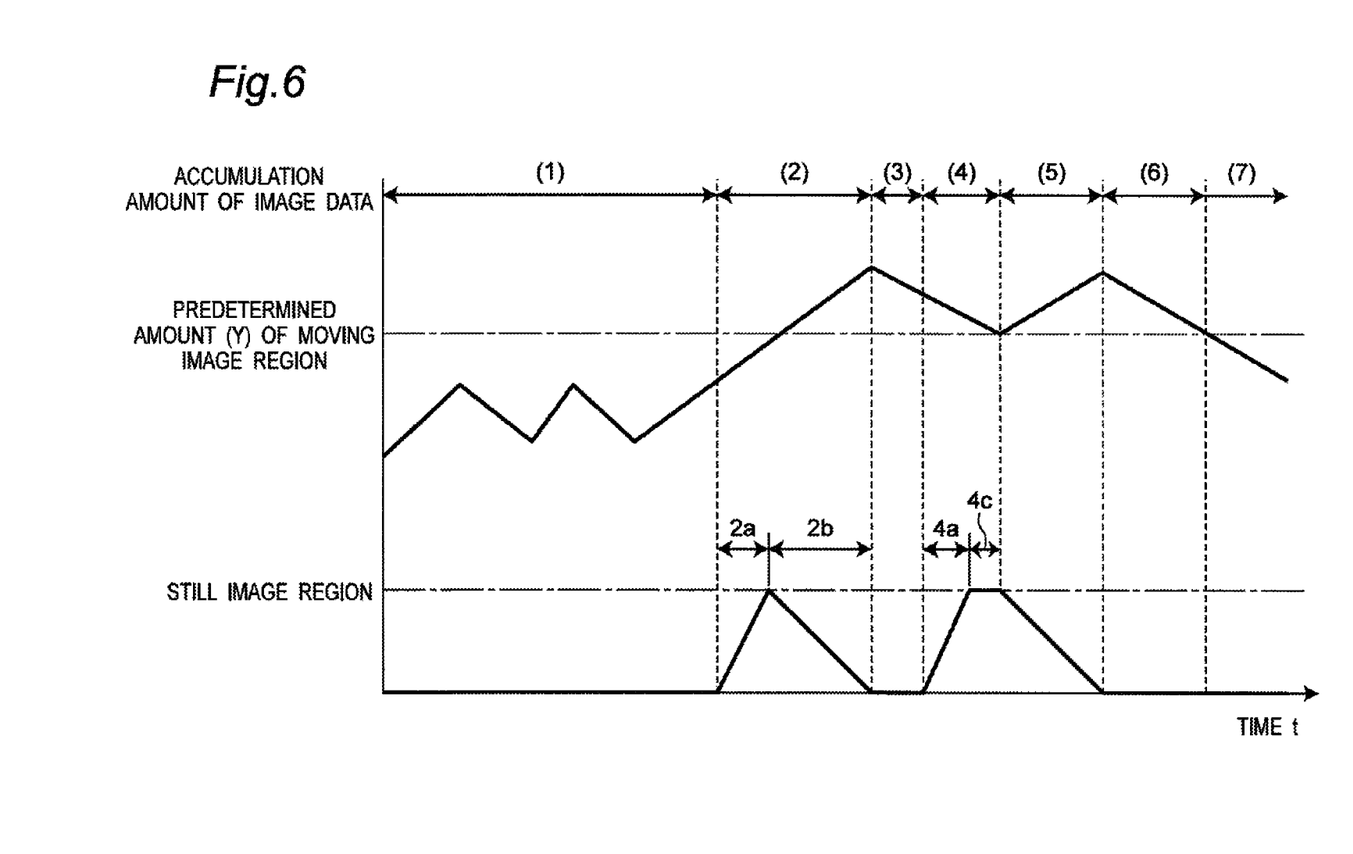
FIG. 6 is a schematic drawing illustrating transitions of amounts of moving image data and still image data accumulated in the memory 290 in the digital video camera 100 when a still image is recorded during the recording of a moving image.

The operation in the case where the imaging of a still image is instructed during the recording of moving image data in the digital video camera 100 will be explained with reference to FIGS. 4, 5 and 6. FIG. 4 is a flowchart illustrating an operation flow of the recording of a still image during the recording of a moving image. FIG. 5 is a flowchart illustrating an operation flow of data transfer from the memory 290. FIG. 6 is a schematic drawing illustrating transitions of amounts of moving image data and still image data accumulated in the memory 290 in the digital video camera 100.

The operation for recording a still image during the recording of a moving image will be first explained with reference to the flowchart in FIG. 4.

The user can take a moving image using the digital video camera 100 according to the procedure described in item <1-3-1> (step S200).

During the recording of moving image data in the memory card 240, the controller 210 determines whether the user instructs the imaging of a still image, according to whether the still image imaging button is turned ON (step S210).

When the determination is made that the imaging of the still image is instructed (YES at step S210), the check block 320 in the controller 210 determines whether the still image region 294 of the memory 290 has a free space (step S220). In this embodiment, the data capacity of the still image region 294 in the memory 290 is set to a capacity corresponding to the still image data of one page. Instead of this, the data capacity may be set to a capacity corresponding to the still image data of a plurality of pages.

When the determination is made that the still image region 294 in the memory 290 has a free space (YES at step S220), the controller 210 accepts the instruction for taking a still image. And, the controller 210 controls the image processing section 190 so that an input video is converted into still image data. The still image data writing block 305 in the controller 210 records the generated still image data in the still image region 294 of the memory 290 (step S230). On the other hand, when the determination is made that the still image region 294 of the memory 290 does not have a free space (NO at step S220), the controller 210 prohibits the imaging of a still image (step S240).

Next, the operation of the data transfer from the memory 290 will be explained below with reference to the flowchart in FIG. 5.

The transfer of image data from the memory 290 to the memory card 240 is carried out by the card writing block 310. Both moving image data and still image data are transferred to the memory card 240 via the same card slot 230.

In transferring image data from the memory 290 to the memory card 240 (step S300), the check block 320 in the controller 210 first determines whether the still image region 294 in the memory 290 has a free space (step S310). When the check block 320 determines that the still image region 294 a free space (YES at step S310), the card writing block 310 in the controller 210 preferentially transfers the moving image data to the memory card 240 (step S320).

On the other hand, when the check block 320 determines that the still image region 294 in the memory 290 does not have a free space (NO at step S310), the check block 320 in the controller 210 determines whether a data accumulation amount of the moving image region 292 in the memory 290 is equal to or more than a predetermined amount (Y) (step S330). When the check block 320 determines that the data accumulation amount of the moving image region 292 in the memory 290 is equal to or more than the predetermined amount (Y), the card writing block 310 in the controller 210 prohibits the transfer of the still image data and preferentially transfers the moving image data to the memory card 240, from a viewpoint of securely maintaining continuity of the moving image data (step S340). On the other hand, when the check block 320 determines that the data accumulation amount of the moving image region 292 in the memory card 290 does not reach the predetermined amount (Y) (NO at step S330), the card writing block 310 transfers the still image data to the memory card 240 (step S350).

The "predetermined amount (Y)" is one of thresholds relating to the data accumulation amount of the moving image region 292 in the memory 290, and it is determined in view of a given safety factor with respect to a maximum data capacity of the moving image region 292.

The situations in which the instruction for taking a still image is accepted and the situations in which the instruction for taking a still image is not accepted will be concretely explained with reference to FIG. 6. Further, the prohibition and the permission of the transfer of moving image data and still image data will be explained with reference to FIG. 6. A period indicated by a symbol (1) in FIG. 6 is a period for which a moving image is being normally recorded. In this case, since the still image region 294 in the memory 290 has a free space, the controller 210 accepts the instruction for taking a still image.

A period indicated by a symbol (2) is a period for which a still image is recorded (2a) and the still image data is transferred (2b). Therefore, the controller 210 does not accept a next instruction for taking a still image in the period indicated by symbol (2). Further, the controller 210 cannot transfer moving image data in the period (2b) for which the still image data is transferred. Therefore, the accumulation amount of moving image data in the moving image region 292 of the memory 290 continues to increase for the period indicated by symbol (2).

When the period for the transfer of the still image data (2b) ends, the controller 210 become able to transfer the moving image data. As a result, the accumulation amount of moving image data in the moving image region 292 of the memory 290 reduces (periods indicated by symbols (3) and (4)).

When the period indicated by symbol (2) ends, the still image region 294 in the memory 290 becomes to have a free space. As a result, the controller 210 can accept a next instruction for taking a still image. In this example, after the period indicated by symbol (3), the imaging of a still image is started in the period indicated by symbol (4), and the still image is recorded in a period indicated by symbol (4a). At the time when the recording of the still image is ended, moving image data of equal to or more than the predetermined amount (Y) are still accumulated in the moving image region 292 of the memory 290. Therefore, the controller 210 cannot transfer the still image data recorded in the still image region 294 of the memory 290 to the memory card 240 until the amount of the moving image data becomes less than the predetermined amount (Y) (a period indicated by a symbol (4c)).

Only when the accumulation amount of the moving image data in the moving image region 292 of the memory 290 reduces to less than the predetermined amount (Y), the controller 210 become able to transfer the still image data recorded in the still image region 294 of the memory 290 to the memory card 240. That is to say, the controller 210 transfers the still image data recorded in the still image region 294 of the memory 290 to the memory card 240 in a period indicated by a symbol (5). The controller 210 cannot transfer moving image data to the memory card 240 for the period (5) for which the still image data is transferred. Therefore, the accumulation amount of moving image data in the moving image region 292 of the memory 290 continues to increase. When the period (5) for transferring the still image data ends, the controller 210 restarts the transferring of the moving image data. As a result, the accumulation amount of the moving image data in the moving image region 292 of the memory 290 reduces (periods indicated by symbols (6) and (7)).

As explained above, in the digital video camera 100 according to the embodiment, when the instruction for taking a still image is accepted during the recording of a moving image, a determination is made whether the transfer of the still image data is permitted or prohibited according to a status of use of the memory 290. More concretely, the digital video camera 100 determines whether the transfer of still image data is permitted or the transfer of the moving image data is carried out, depending on the accumulation amount of the moving image data in the moving image region 292 of the memory 290 at the time when the transfer of the still image data to the memory card 240 is started. The reason for this will be explained below.

Figure 9:
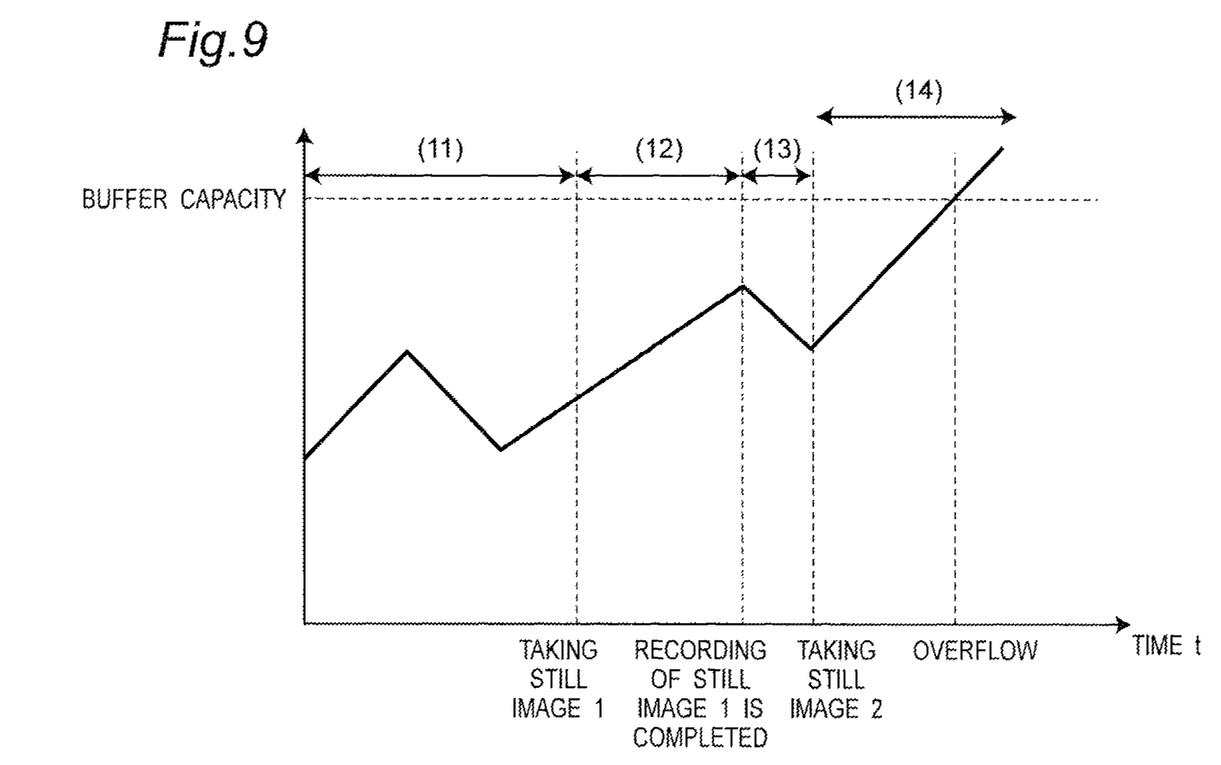
FIG. 9 is a schematic drawing illustrating a transition of an amount of moving image data accumulated in the memory 290 in a temporary example.

A case where if the instruction for taking a still image is accepted during the recording of a moving image, the transfer of the still image data is always permitted will be explained with reference to FIG. 9. FIG. 9 is a schematic drawing illustrating a transition of an amount of the moving image data accumulated in the memory 290 in a case where the transfer of the still image data is always permitted when the instruction for taking the still image is accepted during the recording of the moving image.

In FIG. 9, a period indicated by a symbol (11) is a period for normal recording of a moving image. For this period, the controller 210 accepts the instruction for taking a still image. A period indicated by a symbol (12) is a period for the recording of a still image. Therefore, in this period, the controller 210 does not accept a next instruction for taking a still image. A period indicated by a symbol (13) is a period for which the recording of the still image data into the memory card 240 is completed. Therefore, the controller 210 accepts a next instruction for taking a still image. A period indicated by a symbol (14) is a period for next recording of a still image (in this case, the check block 320 shown in FIG. 1 is not provided, and the determination step S330 in the flowchart of FIG. 5 is not provided).

Since the check block 320 is not provided and thus the determination step S330 is not provided, the controller 210 always preferentially transfers the still image data recorded in the still image region 294 in the memory 290 to the memory card 240. Therefore, in a state that the accumulation amount of the moving image data in the memory 290 is large (periods indicated by symbols (13) and (14)), when the controller 210 preferentially transfers the still image data recorded in the still image region 294 in the memory 290 to the memory card 240, the amount of the moving image data accumulated in the moving image region 292 in the memory 290 exceeds the memory capacity during next recording of a still image (period indicated by symbol (14)). That is to say, the continuity of the recording of moving image data is deteriorated and destroyed.

In the digital video camera 100 according to the embodiment, any one of the moving image data and the still image data recorded in the memory 290 is transferred to the memory card 240 according to the use condition of the memory 290. As a result, a possibility that the continuity of the recording of moving image data is deteriorated and destroyed can be effectively reduced.

More concretely, in the digital video camera 100, when the accumulation amount of the moving image data in the moving image region 292 of the memory 290 at the time when the transfer of the still image data to the memory card 240 is started exceeds the predetermined amount (Y), the transfer of the still image data is prohibited depending on said accumulation amount of the moving image data in the moving image region 292. As a result, the possibility that the continuity of the recording of the moving image data is deteriorated and destroyed can be effectively reduced.

<1-3-3. Screen Display during Recording of Still Image>

Figure 7:
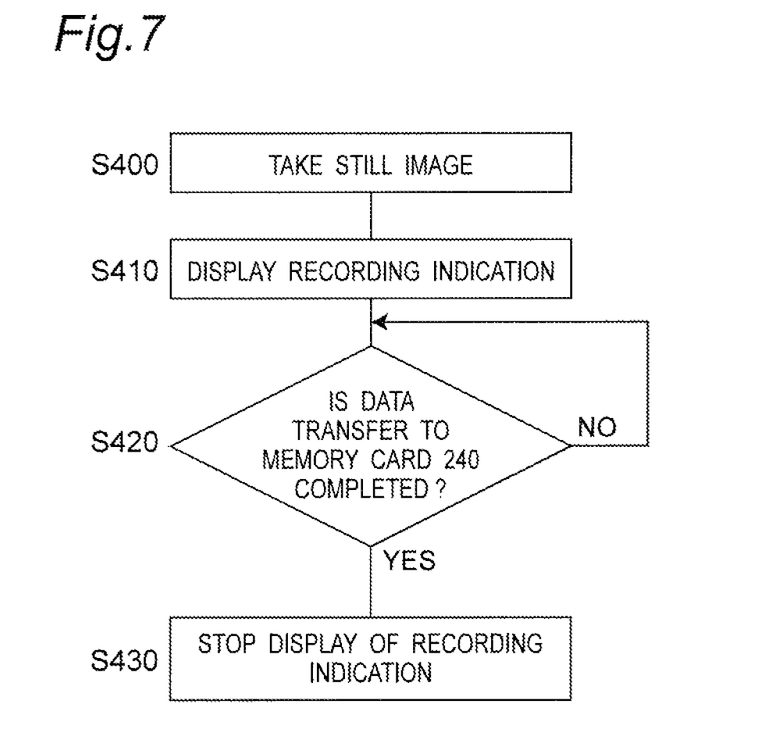
FIG. 7 is a flowchart illustrating a screen display flow during the recording of a still image.
Figure 8:
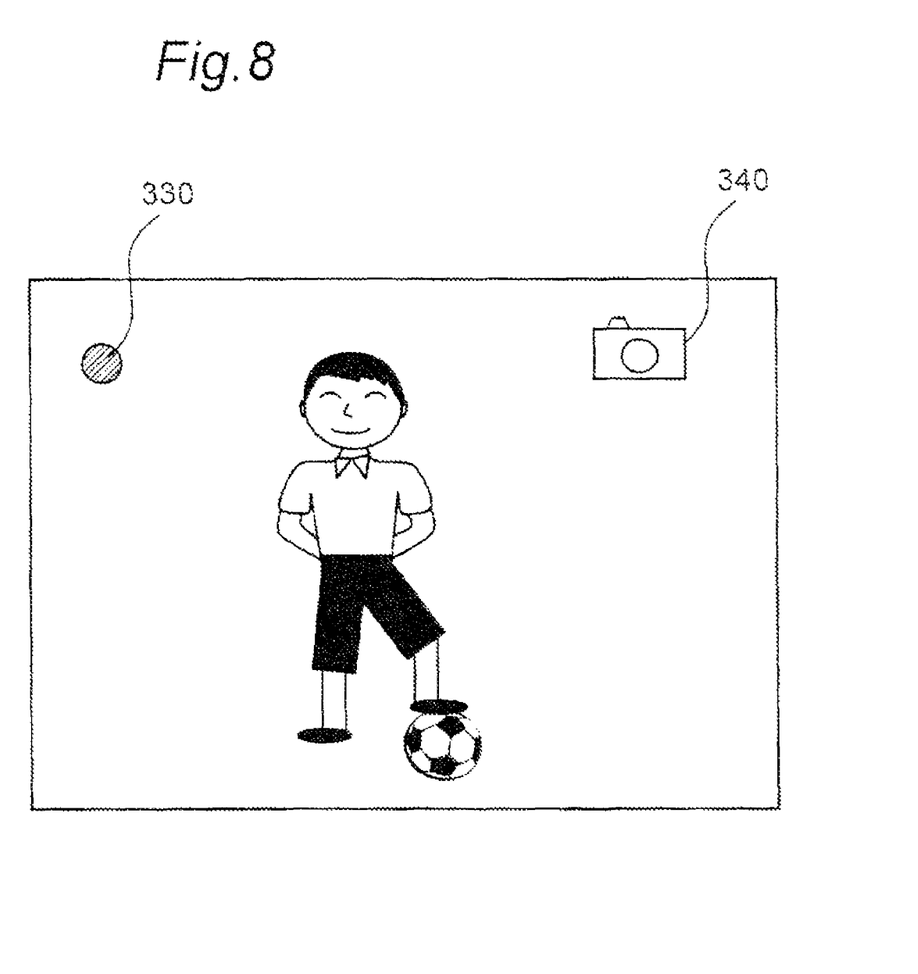
FIG. 8 is a schematic drawing illustrating a screen display on a liquid crystal monitor 270.

The screen display during the recording of a still image will be explained with reference to FIGS. 7 and 8. FIG. 7 is a flowchart illustrating a screen display flow during the recording of a still image in the digital video camera 100. FIG. 8 is a schematic drawing illustrating the screen display on the liquid crystal monitor 270.

Icons to be displayed on the liquid crystal monitor 270 will be first explained with reference to FIG. 8. A moving image recording display icon 330 indicates whether a moving image is being recorded. The moving image recording display icon 330 is displayed in red while a moving image is being recorded and in green while the moving image is not being recorded. A still image recording display icon 340 indicates whether a still image is being recorded. The still image recording display icon 340 is displayed in red while a still image is being recorded and in green while a still image is not being recorded.

A user can take a still image by means of the digital video camera 100 according to the procedure described in item <1-3-2> (step S400).

When the controller 210 accepts the instruction for taking a still image via the shutter button in the operating member 250 from the user, the controller 210 controls the liquid crystal monitor 270 so that the display of the still image recording display 340 is changed into red (step S410).

When the indication of the still image recording display 340 is changed into red, the controller 210 determines whether the transfer of the still image data to the memory card 240 is completed after the recording of the still image is completed (step S420). Periods indicated by symbols (2b) and (5) in FIG. 6 are the periods for determining that the transfer of the still image data to the memory card 240 is not completed (NO at step S420).

The period required for the starting of the transfer of the still image data to the memory card 240 to the completion of said transfer depends on an accumulation amount of the moving image data in the moving image region 292 of the memory 290 at the time when the transfer is started. The larger a degree at which the accumulation amount exceeds the predetermined amount (Y) becomes, the longer the period required for the transfer becomes.

When the determination is made that the transfer of the still image data to the memory card 240 is completed (YES at step S420), the controller 210 controls the liquid crystal monitor 270 so that the red of the still image recording display 340 is changed into green (namely, the display that the still image is being recorded is stopped) (step S430). This corresponds to a transition to the periods indicated by symbols (3) and (6) in FIG. 6.

As explained above, in the digital video camera 100 according to the embodiment, after the display of the still image recording display 340 is changed into red (the display representing that the still image, is being recorded), even if the recording of the still image data into the memory. 290 (namely, to the still image region 294) is completed, the display of the still image recording display 340 is not changed into green (the display representing that the still image is not recorded) until the transfer of the still image data to the memory card 240 is completed. That is to say, in the digital camera 100 according to the embodiment, the period for displaying the still image recording display 340 in red is not fixed.

As a result, even when a still image is not took regardless of pressing-down of the shutter button, the previous imaging of the still image is pretended to continue for the user. That is to say, even when a period for which the still image data recorded in the still image region 294 is not transferred to the memory card 240 is generated like the period indicated by symbol (4c) in FIG. 6, the still image recording display 340 can be displayed in red until a next still image can be took. As a result, a situation that the user misunderstands that the device malfunctions can be avoided.

<2. Another Embodiment>

The first embodiment 1 was described above as the embodiment of the present invention. The present invention is not, however, limited to this. Therefore, another embodiment of the present invention will be explained here.

The optical system and the driving system of the digital camera 100 according to the first embodiment are not limited to those shown in FIG. 1. For example, FIG. 1 illustrates the optical system of the three-group constitution, but the lens constitution may be composed of another group constitution. Further, each of the lenses may be composed of one lens, or may be composed of a lens group including a plurality of lenses.

In the first embodiment, the CCD image sensor 180 is illustrated as an example of the imaging means, but the present invention is not limited to this. For example, the imaging means may be constituted by a CMOS image sensor or an NMOS image sensor.

In the first embodiment, the memory card 240 is illustrated as an example of the second storage means, but the present invention is not limited to this. For example, an HDD or an optical disc such as BD, or a semiconductor memory such a flash memory and the like may be used. In other words, any device may be used as long as it can store data.

In the first embodiment, the still image recording display 340 is displayed in red during the recording of the still image, and the still image recording display 340 is displayed in green when the still image is not recorded. However, the present invention is not necessarily limited to such a constitution. For example, the constitution may be such that the still image recording display 340 is displayed during the recording of a still image, but when a still image is not recorded, the still image recording display 340 itself is not displayed. In other words, any display may be preferable as long as the display shows that a still image is being recorded or a still image is not being recorded for the user.

In the first embodiment, even after the period required for the recording of the still image data in the still image region 294 of the memory 290 (the period (2) in FIG. 6) and for the transfer of the recorded still image data to the memory card 240 ends, when data still remains in the still image region 294

(at the end stage of the period indicated by symbol (5) in FIG. 6), the display of the still image recording display 340 is not returned to green but still displayed in red. However, such a constitution is not always necessary. For example, the display of the still image recording display 340 may be returned to green, and another display such that the instruction for taking a still, image is not accepted may be shown separately from the still image recording display 340.

In the first embodiment, the check block 320 determines whether moving image data of equal to or more than the predetermined amount (Y) is accumulated in the memory 290, but the constitution is not always limited to this. For example, the check block 320 may be configured to determine whether a free space of the memory 290 is less than the predetermined amount (Z).

In the first embodiment, when the instruction for taking a still image is accepted during the recording of a moving image, a determination is made, according to the status of use of the memory 290, which any one of the moving image data and the still image data recorded in the memory 290 is transferred to the memory card 240. However, instead of this, when the moving image data of equal to or more than the predetermined amount (Y) is accumulated in the memory 290, the instruction for taking a still image may not be accepted. The constitution is not always limited to this, and for example, even when the moving image data of equal to or more than the predetermined amount (Y) is accumulated in the memory 290, the instruction for taking a still image may be accepted after the termination of the recording of a moving image is instructed from the user. This is because since the recording of a moving image ends in this case and moving image data is not further accumulated in the memory 290, even if a still image is recorded and writing of the moving image data into the memory card 240 is held, the memory 290 does not overflow.

For example, when moving image data of equal to or more than the predetermined amount (Y) is accumulated in the memory 290 and the user instructs to take a still image, still image data may generated and the generated still image may be stored in another memory. In this case, when the accumulation amount of the moving image data in the memory 290 reduces to less than the predetermined amount (Y), the controller 210 writes the still image data stored in another memory into the memory card 240. As a result, a still image can be took during the recording of the moving image without worrying about the accumulation amount of the moving image data in the memory 290.

As explained above, the present invention is not limited to the above embodiments and modified examples, and it goes without saying that various changes can be made and the design can be improved without deviating from the gist of the invention.

The present invention can be applied to digital video cameras, digital still cameras and mobile telephones with a camera function.

What is claimed is:

1. An imaging system comprising:
   an imaging sensor that takes a subject image and generates still image data and moving image data;
   a first storage medium that temporarily stores the still image data and the moving image data generated by the imaging sensor;
   a second storage medium that stores at least one of the still image data and the moving image data; and
   a controller that:
   (i) enables transfer of the still image data or the moving image data from the first storage medium to the second storage medium,
   (ii) determines when a threshold amount of the moving image data is temporarily stored in the first storage medium, and
   (iii) in response to reaching the threshold amount, the controller prohibits transfer of the still image data from the first storage medium to the second storage medium and enables transfer of the moving image data from the first storage medium to the second storage medium.

2. The imaging system according to claim 1, wherein when the amount of the moving image data temporarily stored in the first storage medium is less than the threshold amount, the controller enables transfer of the still image data from the first storage medium to the second storage medium.

3. The imaging system according to claim 1, further comprising:
   a user interface that accepts an instruction for taking a still image; and
   a display device that starts to display that the still image is being imaged when the use interface accepts the instruction,
   wherein a period for which the display device displays that a still image is being imaged varies according to the amount of the moving image data temporarily stored in the first storage medium.

4. The imaging system according to claim 3, wherein the larger a used amount of the first storage medium becomes, the longer the display period for which the display device displays that the still image is being imaged becomes.

5. The imaging system according to claim 1, wherein the second storage medium is at least one of (i) affixed to a circuit in communication with the controller, (ii) coupled to a circuit in communication with the controller, and (iii) releasable from a circuit in communication with the controller.

* * * * *